Figure 1:
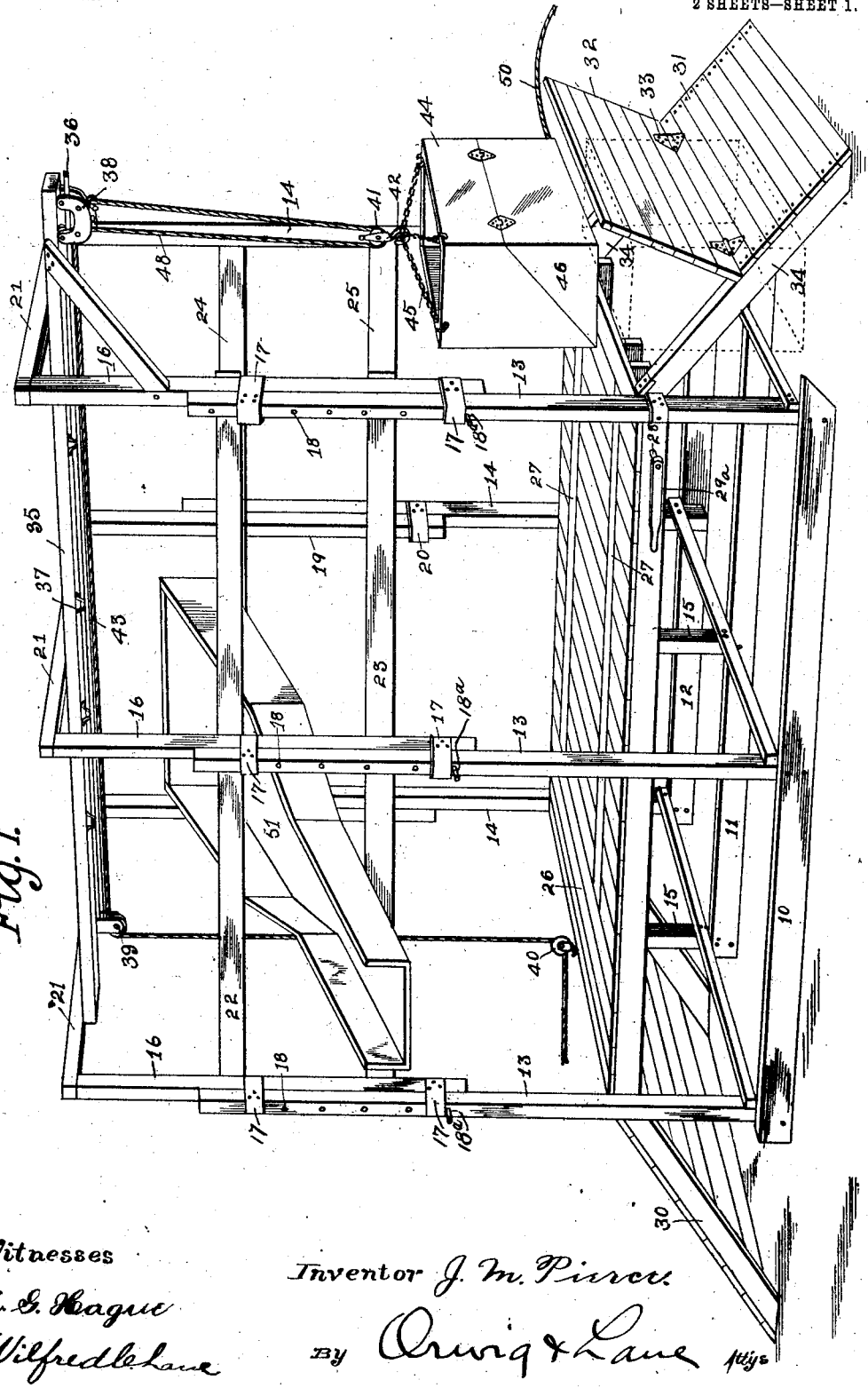

No. 761,709. PATENTED JUNE 7, 1904.
J. M. PIERCE.
UNLOADER AND CONVEYER.
APPLICATION FILED DEC. 15, 1903.
NO MODEL. 2 SHEETS—SHEET 1.

Witnesses
C. G. Hague
Wilfred L. Lane

Inventor J. M. Pierce
By Orwig & Lane Attys

No. 761,709. PATENTED JUNE 7, 1904.
J. M. PIERCE.
UNLOADER AND CONVEYER.
APPLICATION FILED DEC. 15, 1903.
NO MODEL. 2 SHEETS—SHEET 2.
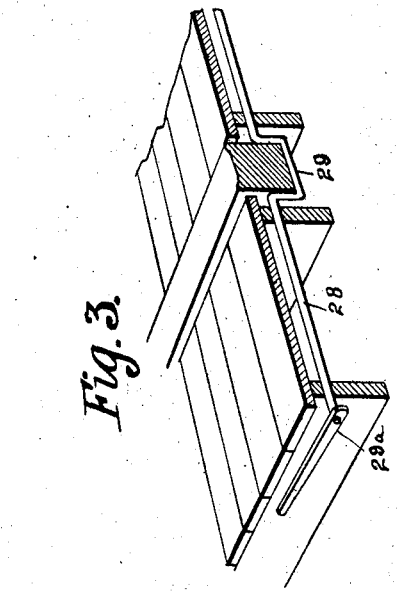
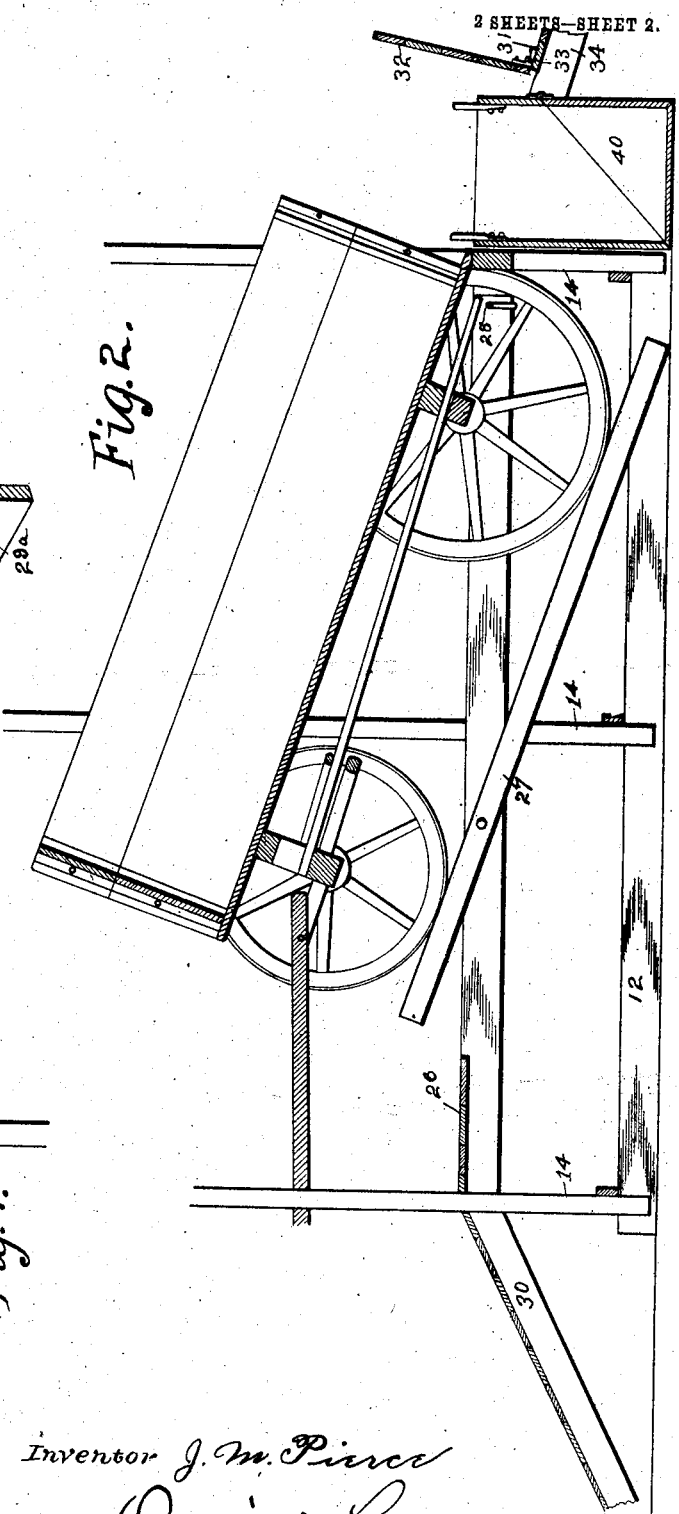
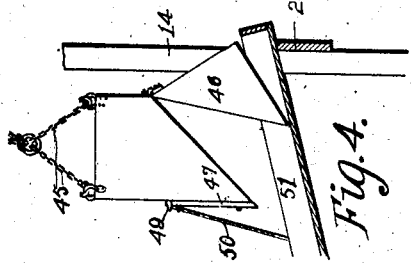
Witnesses
A. G. Hague
Wilfred L. Lane
Inventor J. M. Pierce
By Orwig & Lane
Att'ys
THE NORRIS PETERS CO., PHOTO-LITHO., WASHINGTON, D. C.

No. 761,709.

Patented June 7, 1904.

UNITED STATES PATENT OFFICE.

JAMES M. PIERCE, OF REDFIELD, IOWA.

UNLOADER AND CONVEYER.

SPECIFICATION forming part of Letters Patent No. 761,709, dated June 7, 1904.

Application filed December 15, 1903. Serial No. 185,219. (No model.)

*To all whom it may concern:*

Be it known that I, JAMES M. PIERCE, a citizen of the United States, residing at Redfield, in the county of Dallas and State of Iowa, have invented certain new and useful Improvements in Unloaders and Conveyers, of which the following is a specification.

The objects of my invention are to provide a simple, durable, and inexpensive mechanism with which the grain in a wagon can be easily and readily removed from the wagon and elevated to a position from which it can be easily conveyed into a bin.

A further object is to provide a mechanism for unloading wagons a portion of which will allow the back wheels of the wagon to be dropped a slight distance and at the same time raise the forward wheels slightly, so that the grain in the wagon will be allowed to flow out of the back end of the wagon and drop into a box for elevating and carrying said grain to a position where it can be easily conveyed into a bin.

A further object is to provide means for unloading the wagon which will not necessitate digging into the ground for the purpose of lowering the rear end of the wagon and which obviates the necessity of expensive conveyers, which are prevalent in the use of a large number of grain-unloading devices.

A further object is to provide means whereby the upper portion of the frame of my device and the track which is mounted upon it can be easily and readily raised and lowered, so that it will be of use in a bin of any height.

A further object is to provide a platform in which there are tilting rails and a device for holding said rails in position until the operator desires to release these tilting rails from their normal position and allow them to tilt to throw the rear end of the wagon downwardly, and, further, to provide an approach for said platform in which there is a hinged member which is designed to be swung open when unloading the wagon to allow the conveyer-box to be dropped adjacent to the rear end of the platform and so arranged that the substance in the wagon-box will readily flow into it.

A further object is to provide a conveyer-box which can be easily carried by means of my track and pulley from its position at the rear of the wagon to a position above the conveyer for carrying the substance from the box into the bin, and, further, to provide means for releasing the lower portion of the conveyer-box and allowing it to swing on its hinges, so that the grain will be dropped out from it and onto the conveyer for carrying the grain from the box into the bin.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete device in position for use. The door on the approach in this view is swung open and the conveyer-box is shown in a slightly-raised position, and it is also shown in dotted lines in position for taking the grain from the rear of the wagon. Fig. 2 is a longitudinal sectional view of the lower portion of the device, showing the wagon on a tilting platform in cross-section. Fig. 3 is a sectional view of a portion of the platform, showing a portion of the mechanism for supporting the tilting rails in a normal closed position. Fig. 4 is a side elevation of the conveyer-box in position in which it is when dumping the grain from the box into the conveyer which carries it into the bin. This view shows a portion of the conveyer in cross-section. Fig. 5 is a detail view of the lower front portion of the box, showing the means for locking the lower portion of the box in a closed position.

Referring to the accompanying drawings, I have used the reference-numerals 10, 11, and 12 to indicate the beams upon which my device is mounted. Extending upwardly from the beam 10 are three posts 13. Extending upwardly from the beam 12 are three posts 14. Extending upwardly from the beam 11 are three posts 15, said posts 15 extending but a short distance above the points of attachment. The posts 13 and 14 extend a considerable distance above their points of attachment to the beams 10 and 12, respectively. Slidingly mounted on each of the posts 13 are the beams 16, held in position relative to said beams by means of the sliding members 17, which are designed to allow the beams 16 to be moved vertically relative to the posts 13 and yet prevent it from horizontal movement thereon. In the posts 13 I have provided a series of holes 18, which are designed to receive pins 18ª, and said pins are designed to engage the lower portions of the sliding members 17 and maintain the posts 16 in certain positions of their vertical movement.

Slidingly mounted on each of the posts 14 is a beam 19, which is attached to said posts in the same way that the beams 16 are attached to the posts 13 by means of the sliding members 20, which is firmly attached to the posts 14 and in which the posts 19 slide. The posts 19 are held in position relative to the posts 14 by means of pins extending into openings in the sides of said posts and said pins coacting with the members 20. These sliding members are maintained in position in the same manner that the sliding members 17 are maintained in position. Connecting the top portions of each pair of posts 16 and 19 is a beam 21. The posts 13 are also braced longitudinally by means of the bars 22 and 23. The posts 14 are also braced longitudinally by similar bars 24 and 25.

Firmly attached between the posts 13 and 14 is a platform 26, which is supported by means of said posts and the short posts 15. Pivotally mounted and extending longitudinally of the platform 26 are the rails 27, upon which the wagon is designed to rest when in position for unloading. Extending across and beneath the platform is a rod 28, having two U-shaped portions 29 therein designed to receive the extreme rear end of the rails. Attached to the outer end of this rod 28 is a handle 29ª, which is firmly fixed to said rod. As the forward end of the handle is moved downwardly the rod will be rotated and the U-shaped portions 29 will be thrown out of engagement with the rear ends of the tilting rails, and thus allow the tilting rails to tilt, the rear ends to move downwardly, and the forward ends to move upwardly. Mounted at the forward end of the platform and slanting downwardly therefrom is an approach 30 to said platform, which is detachably connected with the front end of the platform 26. Detachably connected with the rear end of the platform is an approach 31, having the hinged door 32 mounted at its upper portion and capable of swinging upwardly, rearwardly, and then downwardly on its hinges 33 to admit a conveyer-box between the side portions 34 of the approach 31 and to allow the conveyer-box to be below and at the rear of the platform 26 when the wagon which is to be drawn upon the tilting rails is in position for unloading. Extending longitudinally above the platform and attached at the under central portion of the beams 21 is the track-support 35, having the track 36 connected with its under surface by means of the braces 37. Mounted on the track 36 is the carriage 38, having two wheels therein, which is designed to move longitudinally of said track. Attached to the forward end of the support 35 is a pulley 39. Attached to the lower forward end of the platform is a pulley 40. Passing over the wheels in the carriage 38 and under the pulley 41, which is designed to be attached to the hook 42, upon which the box is to be mounted, and attached adjacent to the rear end of the carriage 38 is a rope 43, which is designed to be attached at its forward end to a whiffletree. It will be seen that by drawing the forward end of the rope forward the hook 42 will be raised, and by pulling the rope to its upper limit of movement the carriage 38 will be drawn forwardly to the position desired on the track 36.

Designed to be detachably connected with the hook 42 is the box 44, which is maintained in position relative to said hook 42 by means of the chains 45. Hinged to the rear portion of the box is the swinging member 46, a portion of said member forming the bottom portion of the box. This hinged member is designed to be maintained in a closed position relative to the box, so as to form a complete and tight box, by means of the pivotally-mounted hook 47, which is attached to the front side of the box 44 and is designed to engage the pin 48, which is in the front side of the swinging member 46 when this bottom portion is in a closed position.

Attached to the upper portion of the hook 47 and extending through the loop 49, which is also in the front side of the box 44, is a rope 50, which is designed to swing the hook out of engagement with the pin 48, and thus allow the swinging member 46 of the box 44 to swing from a closed to an open position and allow the substance on its interior to move downwardly. The rope 50 will also serve to pull the box from its forward limit of movement on the track 36 to its rearward limit of movement, as well as to operate the hook 47, inasmuch as the limit of movement of the hook 47 is limited by the loop 49.

Extending across the frame of my device and above the platform and resting on the bars 24 and 23 is the conveyer or chute 51, so arranged that as the conveyer-box 44 is drawn to position over it it will receive the contents of the box after the swinging member 46 has been released from its locked position and will allow the grain to slide over its bottom portion into the bin. This conveyer or chute 51 is detachably mounted on the bars 23 and 24 and may be easily reversed, so as to carry the grain to the opposite side of my device, by placing the rear end of said chute 51 on the bar 22 and the forward end on the bar 25.

In practical operation, and assuming that the parts of the device are assembled in position for use, and that the forward end of the conveyer is extended into the bin in which the grain is to be delivered, and that the conveyer-box 44 is beneath the door 32 of the approach 31, and that the hook 42 is raised to its upper limit of movement, and that the door 32 is in a closed position, then the operator drives the wagon up the approach 31 and onto the rails 27. He then swings the door 32 upwardly, rearwardly, and downwardly until it rests on the lower portion of the approach 31. He attaches the hook 42 to the chains 45 and then turns the forward end of the handle 29ª downwardly, which causes the U-shaped portion 29 of the rod 28 to be swung rearwardly, and thus allow the tracks 27 to swing downwardly at their rear end and upwardly at their forward end on their pivots and come into the position shown in Fig. 2 of the drawings. The operator then by raising the rear end-gate of his wagon a slight distance will allow the grain to flow from the wagon into the conveyer-box until the box 44 is filled. A horse is then attached to the forward end of the rope 43 and driven forwardly, and the conveyer-box 34 is drawn upwardly until the pulley 41 engages the carriage 38. The carriage 38 and the pulleys 41 and the box 44 are drawn forwardly until the box is in position above the chute 51. The operator then pulls the rope 50 and releases the hook 47 from engagement with the pin 48, which allows the swinging portion 46 to swing on its hinges, and the grain drops from the interior of the box 44 onto the chute 51 and moves on said conveyer into the bin. The operator then pulls the box 44 and the pulleys 41 and 38 rearwardly on the track 36 and then pulls the box downwardly into position for refilling. It will be seen that as the wagon is drawn forwardly on the tracks 27 these tracks will be forced to a closed position and be in readiness for another wagon to be drawn upon them after the wagon which has been unloaded passes over the approach 30. A modified form of my device could be easily constructed by leaving the upper portion of the frame off from it by attaching the track to the top of the barn or shed in which the bin was.

Having thus described my invention, what I claim, and desire to secure by Letters Patent of the United States therefor, is—

1. A frame, an adjustably-mounted track, a conveyer-box, means for elevating the box and moving it longitudinally of the track, a chute mounted beneath said track, a platform mounted in the frame, and pivotally-mounted rails extending longitudinally of the platform, means for maintaining the pivotally-mounted rails in position relative to the platform, and means for releasing the rails and allowing them to swing on their pivots.

2. A frame, an adjustably-mounted track, a conveyer-box, means for elevating the box and moving it longitudinally of the track, a chute mounted beneath said track, a platform mounted in the frame, and an approach to said platform detachably connected therewith.

3. A frame, an adjustably-mounted track, a conveyer-box, means for elevating the box and moving it longitudinally of the track, a chute mounted beneath said track, a platform mounted in the frame, an approach to said platform detachably connected therewith, a door hinged to said approach and forming the upper portion of it designed to be swung on its hinges to form an opening in said approach to allow the conveyer-box to drop into it.

4. A frame, an adjustably-mounted track, a conveyer-box, means for elevating the box and moving it longitudinally of the track, a chute mounted beneath said track, a platform mounted in the frame, an approach to said platform detachably connected therewith, a swinging member in said conveyer-box, and means for locking the swinging member in a closed position relative to the box.

5. A frame, an adjustably-mounted track, a conveyer-box, means for elevating the box and moving it longitudinally of the track, a chute mounted beneath said track, a platform mounted in the frame, an approach to said platform detachably connected therewith, a swinging member in said conveyer-box, means for locking the swinging member in a closed position relative to the box, and means for releasing the locking mechanism and allowing the swinging member to swing on its hinges.

JAMES M. PIERCE.

Witnesses:
I. N. BEARD,
J. A. McINTOSH.